United States Patent
Zheng et al.

(10) Patent No.: US 10,609,799 B2
(45) Date of Patent: Mar. 31, 2020

(54) MULTI-OUTPUT DIMMABLE CLASS-2 POWER SUPPLY IN ACCORD WITH AMERICAN STANDARD

(71) Applicant: Zhuhai Shengchang Electronics Co., Ltd., Zhuhai (CN)

(72) Inventors: Dehua Zheng, Zhuhai (CN); Xianyun Zhao, Zhuhai (CN)

(73) Assignee: ZHUHAI SHENGCHANG ELECTRONICS CO, LTD., Zhuhai (CN)

( * ) Notice: Subject to any disclaimer, the term of this patent is extended or adjusted under 35 U.S.C. 154(b) by 0 days.

(21) Appl. No.: 16/425,933

(22) Filed: May 29, 2019

(65) Prior Publication Data

US 2019/0373692 A1 Dec. 5, 2019

(30) Foreign Application Priority Data

Jun. 5, 2018 (CN) .................... 2018 2 0863622 U

(51) Int. Cl.
*H05B 39/02* (2006.01)
*G05F 1/00* (2006.01)
*H05B 45/37* (2020.01)
*H05B 47/10* (2020.01)

(52) U.S. Cl.
CPC ............. *H05B 45/37* (2020.01); *H05B 47/10* (2020.01)

(58) Field of Classification Search
CPC .... H05B 39/09; H05B 41/34; H05B 33/0803; H05B 37/02; H05B 33/0842; H05B 41/3925; H05B 41/2828; H05B 41/28; H05B 41/2827; H05B 41/2855; H05B 33/0815; H05B 33/0818; H05B 41/3921; H05B 41/3927
See application file for complete search history.

(56) References Cited

U.S. PATENT DOCUMENTS

| | | | |
|---|---|---|---|
| 2007/0171684 A1* | 7/2007 | Fukumoto | H02M 7/4807 363/21.09 |
| 2013/0193879 A1* | 8/2013 | Sadwick | H05B 33/0818 315/307 |
| 2014/0265935 A1* | 9/2014 | Sadwick | H05B 33/0815 315/307 |
| 2017/0099004 A1* | 4/2017 | Nishijima | H02M 1/08 |

* cited by examiner

*Primary Examiner* — Minh D A
(74) *Attorney, Agent, or Firm* — Bayramoglu Law Offices LLC

(57) ABSTRACT

A multi-output dimmable CLASS-2 power supply in accord with American standard connected to a dimming control signal includes a switching mode power supply circuit, a dimming control signal to PWM signal transforming circuit, and an overcurrent protection control circuit. The overcurrent protection control circuit includes an overcurrent protection circuit, a MOS transistor, and a resistor. If the multi-output dimmable power supply is required to have n outputs, the multi-output dimmable power supply in accord with American standard CLASS-2 includes n overcurrent protection control circuits, the dimming control signal to PWM signal transforming circuit (12) includes n output ends, and the n overcurrent protection control circuits include n overcurrent protection circuits, n MOS transistors, and n resistors, and the n overcurrent protection control circuits have an identical circuit connection.

5 Claims, 1 Drawing Sheet

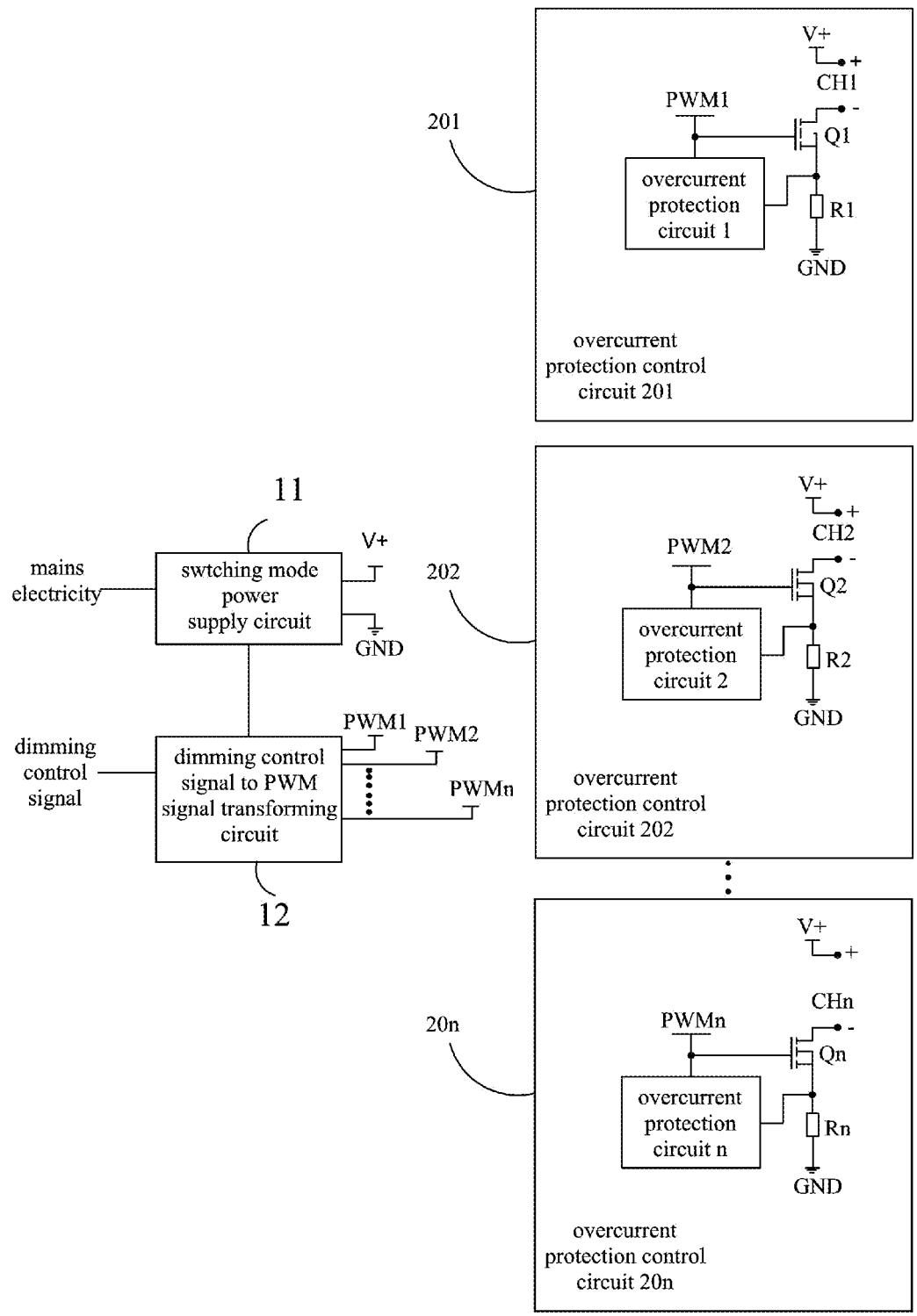

MULTI-OUTPUT DIMMABLE CLASS-2 POWER SUPPLY IN ACCORD WITH AMERICAN STANDARD

CROSS REFERENCE TO RELATED APPLICATIONS

This application is based upon and claims priority to Chinese Patent Application No. 201820863622.0, filed on Jun. 5, 2018, the entire contents of which are incorporated herein by reference.

TECHNICAL FIELD

The present invention relates to a multi-output dimmable CLASS-2 power supply in accord with American standard.

BACKGROUND

At present, the LED lights are prominently used as illumination sources. The dimmable LED lamps have been increasingly used, and in some specific fields, the LED lamps with higher power are required. Some of these fields require the LED lamps to have a power of 200 W, 300 W, or even higher. Moreover, some American standards aiming at the LED lamps require that the output current of the LED driver must not exceed 5 A and the output power must not exceed 100 W. For example, the standards UL1310 and UL8750 require that the nominal output current of the LED driver must not exceed 5 A and nominal output power must not exceed 100 W. Therefore, the existing LED drivers which can reach the power of 200 W, 300 W, or even higher do not meet the CLASS-2 standard.

SUMMARY

It is an objective of the present invention to overcome the drawbacks of the prior art by providing a multi-output dimmable CLASS-2 power supply in accord with American standard. According to the present invention, the current of each output is controlled within a range not exceeding 5 A and the power of each output is controlled within a range not exceeding 100 W to satisfy the requirements of American standard CLASS-2. The number of outputs can be increased or reduced as needed.

The technical solution of the present invention is as follows. A multi-output dimmable CLASS-2 power supply in accord with American standard connected to a dimming control signal includes a switching mode power supply circuit, a dimming control signal to PWM signal transforming circuit, and an overcurrent protection control circuit. An input end of the switching mode power supply circuit is connected to a mains electricity. The switching mode power supply circuit is connected to the dimming control signal to PWM signal transforming circuit. The dimming control signal is connected to an input end of the dimming control signal to PWM signal transforming circuit. An output end of the dimming control signal to PWM signal transforming circuit is connected to the overcurrent protection control circuit. An output positive electrode of the switching mode power supply circuit is connected to the overcurrent protection control circuit. An output negative electrode of the switching mode power supply circuit is connected to a common ground for circuits.

The overcurrent protection control circuit includes an overcurrent protection circuit, a MOS transistor and a resistor. An end of the overcurrent protection circuit is connected to a gate terminal of the MOS transistor and an output end of the dimming control signal to PWM signal transforming circuit. The other end of the overcurrent protection circuit is connected to a drain terminal of the MOS transistor and an end of the resistor. The other end of the resistor is connected to the common ground for the circuits. A source terminal of the MOS transistor is connected to the output positive terminal of the switching mode power supply circuit through a connection terminal.

If the multi-output dimmable power supply is required to have n outputs, the multi-output dimmable power supply in accord with American standard CLASS-2 further includes n overcurrent protection control circuits, and n overcurrent protection circuits, n MOS transistors, and n resistors are correspondingly provided. The n overcurrent protection control circuits have an identical circuit connection.

The present invention has the following advantages. According to the present invention, the multi-output dimmable CLASS-2 power supply connected to the dimming control signal includes the switching mode power supply circuit, the dimming control signal to PWM signal transforming circuit, and the overcurrent protection control circuit. An input end of the switching mode power supply circuit is connected to the mains electricity. The switching mode power supply circuit is connected to the dimming control signal to PWM signal transforming circuit. The dimming control signal is connected to the input end of the dimming control signal to PWM signal transforming circuit. The output end of the dimming control signal to PWM signal transforming circuit is connected to the overcurrent protection control circuit. The output positive electrode of the switching mode power supply circuit is connected to the overcurrent protection control circuit. The output negative electrode of the switching mode power supply circuit is connected to the common ground for the circuits. The overcurrent protection control circuit includes the overcurrent protection circuit, the MOS transistor, and the resistor. The end of the overcurrent protection circuit is connected to the gate terminal of the MOS transistor and the output end of the dimming control signal to PWM signal transforming circuit. The other end of the overcurrent protection circuit is connected to the drain terminal of the MOS transistor and the end of the resistor. The other end of the resistor is connected to the common ground for the circuits. The source terminal of the MOS transistor is connected to the output positive terminal of the switching mode power supply circuit through the connection terminal. If the multi-output dimmable power supply is required to have n outputs, the multi-output dimmable power supply in accord with American standard CLASS-2 further includes n overcurrent protection control circuits. The dimming control signal to PWM signal transforming circuit (12) has one to n corresponding output ends. N overcurrent protection circuits, n MOS transistors, and n resistors are correspondingly provided. The n overcurrent protection control circuits have the identical circuit connection. Therefore, the present invention provides a multi-output dimmable CLASS-2 power supply in accord with American standards. According to the present invention, the current of each output is controlled not to exceed 5 A and the power of each output is controlled not to exceed 100 W, so the American standard CLASS-2 can be satisfied. The number of outputs can be increased or reduced as needed, so as to achieve an overall output power greater than 100 W while meeting the requirements of the American standard CLASS-2.

BRIEF DESCRIPTION OF THE DRAWINGS

The FIGURE is a structural schematic diagram of a circuit according to the present invention.

DETAILED DESCRIPTION OF THE EMBODIMENTS

As shown in the FIGURE, the present invention connected to a dimming control signal includes the switching mode power supply circuit 11, the dimming control signal to PWM signal transforming circuit 12, and the overcurrent protection control circuit 201. An input end of the switching mode power supply circuit 11 is connected to a mains electricity. The switching mode power supply circuit 11 is connected to the dimming control signal to PWM signal transforming circuit 12. The dimming control signal is connected to an input end of the dimming control signal to PWM signal transforming circuit 12. An output end of the dimming control signal to PWM signal transforming circuit 12 is connected to the overcurrent protection control circuit 201. An output positive terminal of the switching mode power supply circuit 11 is connected to the overcurrent protection control circuit 201. An output negative terminal of the switching mode power supply circuit 11 is connected to a common ground for the circuits.

The overcurrent protection control circuit 201 includes the overcurrent protection circuit 1, the MOS transistor Q1 and the resistor R1. An end of the overcurrent protection circuit 1 is connected to a gate terminal of the MOS transistor Q1 and an output end of the dimming control signal to PWM signal transforming circuit 12. The other end of the overcurrent protection circuit 1 is connected to a drain terminal of the MOS transistor Q1 and an end of the resistor R1. The other end of resistor R1 is connected to the common ground for the circuits. A source terminal of the MOS transistor Q1 is connected to an output positive terminal of the switching mode power supply circuit 11 through a connection terminal.

If the multi-output dimmable power supply is required to have n outputs, the multi-output dimmable power supply in accord with American standard CLASS-2 further includes n overcurrent protection control circuits, i.e. the overcurrent protection control circuit 201 to the overcurrent protection control circuit 20n. The dimming control signal to PWM signal transforming circuit 12 has one to n corresponding output ends. N overcurrent protection circuits, n MOS transistors, and n resistors, i.e. overcurrent protection circuit 1 to overcurrent protection circuit n, MOS transistor Q1 to MOS transistor Qn, resistor R1 to resistor Rn are correspondingly provided. The overcurrent protection control circuit 201 to the overcurrent protection control circuit 20n have an identical circuit connection.

In the present embodiment, the multi-output dimmable CLASS-2 power supply in accord with American standard includes the switching mode power supply circuit 11, the dimming control signal to PWM signal transforming circuit 12, the overcurrent protection circuit 1, the MOS transistor Q1, and the resistor R1. If the multi-output dimmable power supply is required to have n outputs, the multi-output dimmable CLASS-2 power supply in accord with American standard further includes n overcurrent protection circuits 1 to n, n MOS transistors Q1 to Qn, and n resistors R1 to Rn. The switching mode power supply circuit 11 is connected to an input end of the main supply. The switching mode power supply circuit 11 is connected to the dimming control signal to PWM signal transforming circuit 12, and the switching mode power supply circuit 11 is connected to each of the overcurrent protection circuits n. The output positive terminal V+ of the switching mode power supply circuit 11 is a positive terminal + of each output. An output ground end of the switching mode power supply circuit 11 is a common ground end. The dimming control signal to PWM signal transforming circuit 12 is connected to each overcurrent protection circuit n and the gate terminal of the MOS transistor Q. An end of each overcurrent protection circuit n is connected to the gate terminal of the MOS transistor Q. The other end of each overcurrent protection circuit n is connected to the source terminal of the MOS transistor Q and an end of the resistor R. The drain terminal of each MOS transistor Q is the negative terminal of each output. The other end of each resistor R is connected to the common ground end.

The switching mode power supply circuit 11 converts the output municipal power to have the voltage suitable for the lamp, meanwhile, supplying power to the dimming control signal to PWM signal transforming circuit 12 and each of the overcurrent protection control circuits 20n. The switching mode power supply circuit 11 may be a switching mode power supply with or without power-factor correction or a switching mode power supply of any topological structure. The dimming control signal to PWM signal transforming circuit 12 may be any dimming control signal to PWM signal transforming circuit, such as, a 0-10V PWM signal transforming circuit, a silicon controlled dimming signal to PWM signal transforming circuit, a DALI signal to PWM signal transforming circuit, a wireless signal to PWM signal transforming circuit and so on. The PWM signal obtained from the dimming control signal to PWM signal transforming circuit 12 may be independent or in parallel. Each PWM signal is input to the gate terminal of the MOS transistor to control an output of the MOS transistor and realize the dimming function of each circuit. Each overcurrent protection circuit n monitor the voltage on the resistor R in real time. If current of any of the outputs exceeds the output current rating, the voltage of the resistor R will rise to a threshold voltage value. When the overcurrent protection circuit n detects the increase of the voltage of the resistor R to the threshold voltage, the MOS transistor Q will be immediately shut down to stop outputting, avoiding the output current to exceed 5 A during use. The method to limit the power is also realized by limiting the current rating. Since the switching mode power supply circuit 11 has a constant output voltage, it only needs to limit the output current to ensure that a result of the output current multiplying the output voltage does not exceed 100 W to satisfy the requirements of CLASS-2. Thus, as long as each of the overcurrent protection circuits is managed to control the current, the current and power of each output can be controlled within 5 A and 100 W, and the multi-output power supply can make it a power supply of high power which satisfies the requirements of CLASS-2. For example, as for a power supply with an output voltage of 12V, each output current is limited within 5 A, so the power of each output is limited within 60 W, which satisfies the requirement of CLASS-2; as for a power supply with an output voltage of 24 V, each output current is limited within 4 A, so the power of each output is limited within 96 W, which also satisfies the requirement of CLASS-2, so the multi-output power supply can satisfy the requirement of high power.

Above all, the present invention can be widely applied to the dimmable LED power supply required for satisfying American standard CLASS-2. The above-mentioned embodiments are merely the preferred embodiments of the present invention, which are not intended to limit the scope of the present invention. Any modifications, improvements, or equivalent substitutions derived based on the concepts and materials of the present invention should be considered as falling within the scope of the present invention.

What is claimed is:

1. A multi-output dimmable CLASS-2 power supply in accord with American standard connected to a dimming control signal comprising a switching mode power supply circuit, a dimming control signal to PWM signal transforming circuit, and an overcurrent protection control circuit;

wherein, an input end of the switching mode power supply circuit is connected to a mains electricity, the switching mode power supply circuit is connected to the dimming control signal to PWM signal transforming circuit, the dimming control signal is connected to an input end of the dimming control signal to PWM signal transforming circuit, an output end of the dimming control signal to PWM signal transforming circuit is connected to the overcurrent protection control circuit, an output positive terminal of the switching mode power supply circuit is connected to the overcurrent protection control circuit, and an output negative terminal of the switching mode power supply circuit is connected to a common ground for circuits;

wherein the overcurrent protection control circuit comprises an overcurrent protection circuit, a MOS transistor and a resistor, a first end of the overcurrent protection circuit is directly connected to a gate terminal of the MOS transistor and an output end of the dimming control signal to PWM signal transforming circuit, a second end of the overcurrent protection circuit is connected to a drain terminal of the MOS transistor and a first end of the resistor, a second end of the resistor is connected to the common ground for the circuits, and a source terminal of the MOS transistor is connected to the output positive terminal of the switching mode power supply circuit through a connection terminal.

2. The multi-output dimmable CLASS-2 power supply in accord with American standard according to claim 1, wherein the multi-output dimmable power supply comprises n outputs, the multi-output dimmable power supply in accord with American standard CLASS-2 comprises n overcurrent protection control circuits, the dimming control signal to PWM signal transforming circuit comprises n output ends, the n overcurrent protection control circuits comprises n overcurrent protection circuits, n MOS transistors, and n resistors, and the n overcurrent protection control circuits have an identical circuit connection.

3. The multi-output dimmable CLASS-2 power supply in accord with American standard according to claim 2, wherein, a current of each output is controlled within a range not exceeding 5 A and a power of each output is controlled within a range not exceeding 100 W.

4. The multi-output dimmable CLASS-2 power supply in accord with American standard according to claim 1, wherein the overcurrent protection control circuit consists of an overcurrent protection circuit, a MOS transistor and a resistor, a first end of the overcurrent protection circuit is connected to a gate terminal of the MOS transistor and an output end of the dimming control signal to PWM signal transforming circuit, a second end of the overcurrent protection circuit is connected to a drain terminal of the MOS transistor and a first end of the resistor, a second end of the resistor is connected to the common ground for the circuits, and a source terminal of the MOS transistor is connected to the output positive terminal of the switching mode power supply circuit through a connection terminal.

5. A multi-output dimmable CLASS-2 power supply in accord with American standard connected to a dimming control signal, consisting of: a switching mode power supply circuit, a dimming control signal to PWM signal transforming circuit, and an overcurrent protection control circuit;

wherein, an input end of the switching mode power supply circuit is connected to a mains electricity, the switching mode power supply circuit is connected to the dimming control signal to PWM signal transforming circuit, the dimming control signal is connected to an input end of the dimming control signal to PWM signal transforming circuit, an output end of the dimming control signal to PWM signal transforming circuit is connected to the overcurrent protection control circuit, an output positive terminal of the switching mode power supply circuit is connected to the overcurrent protection control circuit, and an output negative terminal of the switching mode power supply circuit is connected to a common ground for circuits.

* * * * *